(12) United States Patent
Saito

(10) Patent No.: US 8,194,157 B2
(45) Date of Patent: Jun. 5, 2012

(54) IMAGE-PICKUP APPARATUS AND A ZOOM LENS FOR THE IMAGE-PICKUP APPARATUS, WITH DISTORTION CORRECTION

(75) Inventor: Shinichiro Saito, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 863 days.

(21) Appl. No.: 12/169,050

(22) Filed: Jul. 8, 2008

(65) Prior Publication Data

US 2009/0015694 A1 Jan. 15, 2009

(30) Foreign Application Priority Data

Jul. 9, 2007 (JP) ................................. 2007-179211

(51) Int. Cl.
*H04N 5/262* (2006.01)
(52) U.S. Cl. .................. 348/240.3; 348/241; 348/240.1; 396/79; 359/682; 359/687
(58) Field of Classification Search ................ 348/240.3
See application file for complete search history.

(56) References Cited

U.S. PATENT DOCUMENTS

| | | | | |
|---|---|---|---|---|
| 5,905,530 A | * | 5/1999 | Yokota et al. | ............ 348/240.99 |
| 2005/0063070 A1 | * | 3/2005 | Watanabe et al. | ............. 359/689 |
| 2005/0213159 A1 | | 9/2005 | Okada et al. | |
| 2006/0147200 A1 | * | 7/2006 | Arimoto et al. | ............... 396/529 |
| 2007/0126892 A1 | | 6/2007 | Guan | |
| 2008/0239107 A1 | * | 10/2008 | Cho | ............................. 348/241 |
| 2010/0182677 A1 | * | 7/2010 | Wang et al. | .................... 359/356 |
| 2010/0196002 A1 | * | 8/2010 | Uchida et al. | ................. 396/529 |
| 2010/0245629 A1 | * | 9/2010 | Nanba et al. | ............... 348/240.1 |
| 2010/0265365 A1 | * | 10/2010 | Oshita | ........................... 348/241 |

FOREIGN PATENT DOCUMENTS

| | | |
|---|---|---|
| JP | 06237406 A | 8/1994 |
| JP | 2003-123064 A | 4/2003 |
| JP | 2005-286482 A | 10/2005 |
| JP | 2006-270918 A | 10/2006 |
| JP | 2007005912 A | 1/2007 |

* cited by examiner

*Primary Examiner* — Jason Chan
*Assistant Examiner* — Cynthia Segura
(74) *Attorney, Agent, or Firm* — Rossi, Kimms & McDowell LLP

(57) ABSTRACT

An image-pickup apparatus includes an image-pickup element that photoelectrically converts an optical image formed by an image-pickup optical system having a zoom function, and a correcting part that performs correction processing for a distortion component in image data generated based on an output from the image-pickup element, the distortion component corresponding to a distortion of the image-pickup optical system. The image-pickup optical system provides a first zoom range in which a distortion amount at a certain image height is larger than a predetermined value and a second zoom range in which a distortion amount at the certain image height is smaller than the predetermined value. The correcting part performs the correction processing so that the distortion component remains in a first corrected image data in the first zoom range is larger than the distortion component remaining in a second corrected image data in the second zoom range.

12 Claims, 10 Drawing Sheets

IMAGE-PICKUP APPARATUS AND A ZOOM LENS FOR THE IMAGE-PICKUP APPARATUS, WITH DISTORTION CORRECTION

BACKGROUND OF THE INVENTION

The present invention relates to an image-pickup apparatus such as a digital still camera or a digital video camera having an electronic distortion correction function and relates to an interchangeable lens mounted to the image-pickup apparatus.

The image-pickup apparatus capturing an image (image data) using a solid-state image-pickup element such as a CCD sensor or a CMOS sensor includes an image-pickup optical system equipped thereto or detachably mounted thereto. Along with a trend for the miniaturization of the image-pickup apparatus, the image-pickup optical system also is being made miniaturized. The miniaturization of the image-pickup optical system, however, makes it more difficult to correct optical aberrations sufficiently. Thus, the captured image data often has to be subjected to the processing of electronically correcting the aberration component thereof.

Japanese Patent Laid-Open No. 2005-286482 discloses a method of, based on an image-height vs. distortion data indicating a relationship between a coordinate position of image data and a distortion at each image height, correcting a distortion component of the image data due to the distortion in the image-pickup optical system.

Japanese Patent Laid-Open No. 2006-270918 discloses a method of correcting a distortion component for image data using data indicating a distortion corresponding to a zoom position and an object distance of an image-pickup optical system.

The distortion correction methods disclosed in Japanese Patent Laid-Open No. 2005-286482 and Japanese Patent Laid-Open No. 2006-270918, however, try to achieve accurate distortion correction over the entire zoom range of the image-pickup optical system, which causes deterioration in image quality instead.

Note here that a distortion amount at each image height of an image-pickup optical system, in general, changes with a zoom position of the image-pickup optical system. For instance, a zoom position closer to the wide-angle end means an increase in the distortion amount.

On the other hand, the distortion correction processing of image data is basically a coordinate transformation processing in which each coordinate (each pixel) of image data including a distortion component is transformed into a coordinate from which the distortion component has been removed or decreased, the distortion component being obtained by the calculation based on data concerning the distortion. Such coordinate transformation processing leads to a decrease in resolution of the corrected image data, i.e., deterioration in image quality.

In addition, the accurate distortion correction performed over the entire zoom range of the image-pickup optical system results in a large load on a calculating circuit that performs calculation for the correction or an increase in memory capacity that stores data relating to the distortion used for the calculation.

Especially in the case of an image-pickup apparatus required to output a real-time image with continuity rather than a high-quality image, such as in the case of a monitoring camera, excessive distortion correction processing and a large calculation load may degrade the performance as the image-pickup apparatus.

BRIEF SUMMARY OF THE INVENTION

The present invention provides an image-pickup apparatus enabling distortion correction processing favorably performed within a range that does not cause image deterioration in image data acquired using the image-pickup apparatus whose distortion amount varies with its zoom state, and provides an interchangeable lens used for the image-pickup apparatus.

The present invention further provides an image-pickup apparatus enabling image data of a favorable image quality at each zoom state, while suppressing an increase in calculation load and memory capacity for distortion correction, and provides an interchangeable lens used for the image-pickup apparatus.

An image-pickup apparatus as one aspect of the present invention includes an image-pickup element that photoelectrically converts an optical image formed by an image-pickup optical system having a zoom function, and a correcting part that performs correction processing for a distortion component in image data generated based on an output from the image-pickup element, the distortion component corresponding to a distortion of the image-pickup optical system. The image-pickup optical system provides a first zoom range in which a distortion amount at a certain image height is larger than a predetermined value and a second zoom range in which a distortion amount at the certain image height is smaller than the predetermined value. The correcting part performs the correction processing so that the distortion component remains in a first corrected image data obtained by correcting the image data generated in the first zoom range is larger than the distortion component remaining in a second corrected image data obtained by correcting the image data generated in the second zoom range.

An image-pickup apparatus as another aspect of the present invention includes an image-pickup element that photoelectrically converts an optical image formed by an image-pickup optical system having a zoom function, and a correcting part that performs correction processing for a distortion component in image data generated based on an output from the image-pickup element, the distortion component corresponding to a distortion of the image-pickup optical system. The image-pickup optical system provides a first zoom range in which a distortion amount at a certain image height is larger than a predetermined value and a second zoom range in which a distortion amount at the certain image height is smaller than the predetermined value. The correcting part performs the correction processing in the first zoom range and limits the correction processing in the second zoom range.

A lens that is detachably attached to the above image-pickup apparatus as another aspect of the present invention includes an image-pickup optical system having a zoom function and providing a first zoom range in which a distortion amount at a certain image height is larger than a predetermined value, and a second zoom range in which a distortion amount at the certain image height is smaller than the predetermined value, and a memory that stores data used for the correction processing by the image-pickup apparatus.

Other aspects of the present invention will become apparent from the following description and the attached drawings.

DETAILED DESCRIPTION OF THE EMBODIMENTS

Figure 1:
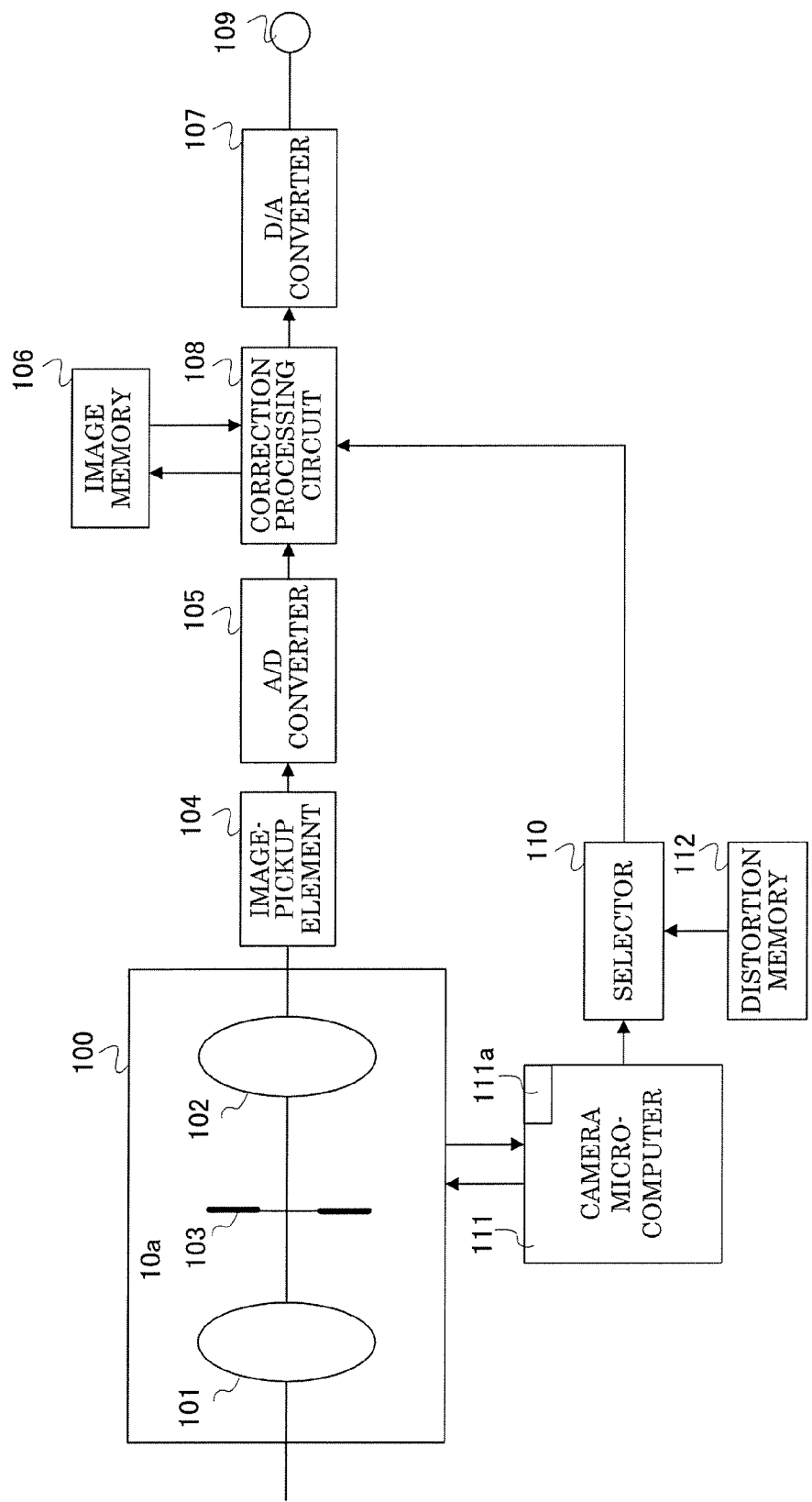
FIG. 1 is a block diagram showing the configuration of an image-pickup apparatus that is Embodiment 1 of the present invention.

Exemplary embodiments of the present invention will hereinafter be described with reference to the accompanying drawings.

Prior to the description of specific embodiments, basic concepts of the embodiments of the present invention will be described below.

In the following description, a distortion and an amount thereof occurring in an image-pickup optical system are referred to as an optical distortion and an optical distortion amount, respectively. A distortion and an amount thereof (magnitude) included in image data in accordance with the optical distortion are referred to as a distortion component and a distortion component amount, respectively. The correction processing of an electronic distortion component for the image data is referred to as distortion correction processing. The image data may be referred to as an image simply.

As described later, in Embodiments 1 and 2, in a first zoom range at a wide-angle end of an image-pickup optical system having a zoom function (hereinafter called a zoom lens) or in the vicinity thereof where an optical distortion at a certain image height is larger than a predetermined value (or the predetermined value or larger), the distortion correction processing permitting the remainder of a distortion component to some extent is performed by a correcting part. In other words, the distortion correction processing in the first zoom range is performed (a correction factor is selected) so that a distortion component remains in the image data more than in a second zoom range after the distortion correction processing.

In further other words, the correcting part performs the correction processing so that the distortion component remains in a first corrected image data obtained by correcting the image data generated in the first zoom range is larger than the distortion component remaining in a second corrected image data obtained by correcting the image data generated in the second zoom range.

In the second region, an optical distortion at the certain image height is smaller than the predetermined value.

This is because, since the resolution of the image decreases and image quality deteriorates inversely with the correction amount of the distortion component, the distortion component of 0 does not necessarily mean the ideal. For instance, when the distortion correction processing is performed so as to leave the distortion component of 0.5% or more, an image with a less distortion component can be obtained while avoiding the deterioration in image quality due to excessive correction.

On the other hand, in the second zoom range, distortion correction with a maximum high accuracy can be performed, which means to minimize a remaining distortion component.

According to Embodiments 1 and 2, an image of a favorable image quality with a less distortion component can be obtained over the entire zoom range while suppressing deterioration in image quality (decrease in resolution) resulting from the distortion correction processing in the first zoom range with a large optical distortion. In addition, since the distortion correction processing with excessive high accuracy is not performed in the first zoom range, the calculation load can be reduced, thus shortening the time required for the distortion correction processing.

In Embodiment 3 described later, the switching is performed in accordance with the zoom range as to whether or not to perform the distortion correction processing. More specifically, in a first zoom range where the optical distortion amount at a certain image height is larger than a predetermined value (or the predetermined value or larger), the distortion correction processing is performed, whereas in a second zoom range where the optical distortion amount at the certain image height is smaller the predetermined value, the distortion correction processing is limited, i.e., not performed (prohibited). The distortion correction processing in the second zoom range may be performed so that deterioration of image quality caused by the distortion correction processing is smaller than that caused by the distortion correction processing performed in the first zoom range.

In a zoom range where the optical distortion amount is originally small, a favorable image can be obtained without the distortion correction processing. Thus, the distortion correction processing is performed only in the first zoom range where the distortion component in the image is conspicuous, whereby favorable image data can be obtained in each zoom range while suppressing an increase in calculation load and memory capacity.

For instance, in the case where the distortion correction processing is performed in a zoom range (the second zoom range) with an absolute value of the optical distortion of less than 1% at the image height with an image height ratio of 70% with reference to the maximum image height of the image-pickup element, a difference between non-corrected coordinates (x, y) and corrected coordinates (X, Y) often will not be 1 pixel or more. Therefore, the distortion correction processing in this range causes a problem of the deterioration in resolving power being more significant than the effect of the distortion correction processing. Therefore, it is preferable that the distortion correction processing is not performed in the zoom range with an absolute value of the optical distortion of less than 1%.

In the case where a zoom lens is such a type of generating a negative larger (barrel-shaped) distortion in a zoom range closer to a wide-angle end, whereas generating a smaller distortion amount closer to a telephoto end, the first zoom range where the distortion correction processing is to be performed may be decided as follows. That is, the first range may be set as the whole or a part of the range from the wide-angle end to the zoom position where the absolute value of the optical distortion at the image height with the image height ratio of 70% of the maximum image height decreases firstly to be 1% (a portion obtained by removing the zoom position with the absolute value of 1%). Thereby, the distortion correction processing can be performed to the appropriate and only range, thus reducing a calculation load and a required memory capacity.

Alternatively, the distortion correction processing may be performed (only) in a zoom range (the first zoom range) where the absolute value of the optical distortion at the image height with the image height ratio of 70% of the maximum image height of the image-pickup element is larger than 3% (or 3% or larger). Further, the distortion correction processing may be performed (only) in a zoom range where the absolute value of the optical distortion is larger than 5% (or 5% or larger).

In these cases, the distortion correction processing preferably is performed as in Embodiment 1 so as to permit the remainder of the distortion component to some extent.

In each embodiment, the distortion correction processing may be performed by polynomial approximation where data for performing the distortion correction processing (e.g., data concerning the optical distortion, hereinafter simply called distortion data) is set as a parameter. Thereby, a memory capacity for storing the distortion data therein can be saved, and the correction result also can be smooth, which means a natural image.

Furthermore, when the distortion correction processing is performed, a distortion correction parameter may be decided in ranges obtained by dividing a light-receiving area on the image-pickup element into two ranges vertically or horizontally with reference to the optical axis position of the image-pickup optical system. The reason is as follows. In a rotationally-symmetric optical system with reference to the optical axis, the optical distortion is represented with one parameter. In this case, however, the optical distortion has to be decomposed into vertical and horizontal distortion components when the distortion correction is performed. Then, in each divided range, an optical distortion amount or a distortion component amount calculated from a magnification varying lens position (zoom position) and a focus lens position (focus position) making up the image-pickup optical system is stored in a memory. Thereby, the calculation for the distortion correction processing can be speeded up.

The light-receiving area may be divided into two exact halves vertically and horizontally, and a correction amount for the distortion component may be calculated in each of the thus divided four ranges. Thereby, a correspondence between the distortion, the image height, the non-corrected coordinates (x, y) and the corrected coordinates (X, Y) can be obtained, which makes it easy to correspond them to the correction amount of the distortion component.

In each embodiment, since the distortion amount varies significantly with the zoom position, the distortion data is preferably stored in a memory while being associated with the zoom position. However, to store the distortion data for all zoom positions will make the memory capacity large. Therefore, the distortion data in a zoom range to which the distortion correction processing is to be performed only may be stored in the memory, or only data from which the distortion data over the entire zoom range can be calculated by interpolation calculation may be stored in the memory.

Moreover, the distortion correction processing is performed so that a corrected image corresponding to a shape of the optical distortion amount (distortion curve) according to the zoom positions that the image-pickup optical system originally has can be obtained. Thereby, a natural corrected image can be obtained at each zoom position.

When the distortion correction processing is performed, correction for chromatic aberration of magnification (edge processing) may also be performed. Thereby, a high-resolution image with a clear edge can be obtained. For instance, in the case of image data having red, green and blue signals, data for correcting the chromatic aberration of magnification may be determined in accordance with the amounts of chromatic aberration of magnification of the red and blue signals with reference to the green signals.

Embodiment 1

FIG. 1 illustrates the configuration of an image-pickup apparatus that is Embodiment 1 of the present invention. In the present embodiment and other embodiments described later, the image-pickup apparatus intended is a video camera preferable to a monitoring camera. The configuration and the features of each embodiment, however, are not limited to the monitoring camera, and can be applied to general image-pickup apparatuses as well.

In FIG. 1, reference numeral 100 denotes a zoom lens as an image-pickup system having a zoom function, which forms an object image (optical image). The zoom lens 100 includes, in order of distance from the object, a variator 101 that moves in the optical axis direction to vary the magnification, an aperture stop 103 that adjusts the light amount, and a compensator 102 that moves in the optical axis direction to compensate the variation of image plane resulting from the focusing and the magnification varying.

Reference numeral 104 denotes an image-pickup element, which may be a photoelectric conversion element such as a CCD sensor or a CMOS sensor. An analogue output signal from the image-pickup element 104 is converted into digital image data by an A/D converter 105. The digital image data (hereinafter simply called image data) is then input to a correction processing circuit 108 as the correcting part. The correction processing circuit 108 causes an image memory 106 to store the image data temporarily.

The zoom control, the aperture stop control and the focus control of the zoom lens 100 are performed by a camera microcomputer (hereinafter simply called a microcomputer) 111 made up of a CPU or the like. The microcomputer 111 refers to the memory, as needed, for appropriate processing.

Reference numeral 110 denotes a selector, which reads out data (distortion data) relating to optical distortion of the zoom lens 100 from a distortion memory 112 in accordance with a zoom position (zoom range) and sends the same to the correction processing circuit 108.

The distortion memory 112 stores distortion data discretely at four representative image heights (30% image height, 50% image height, 70% image height, and 90% image height) at ten zoom positions representative of the entire zoom range (hereinafter called representative zoom positions). Herein, N % image height means the image height where the image height ratio becomes N % with respect to the image-pickup element 104.

Figure 2:
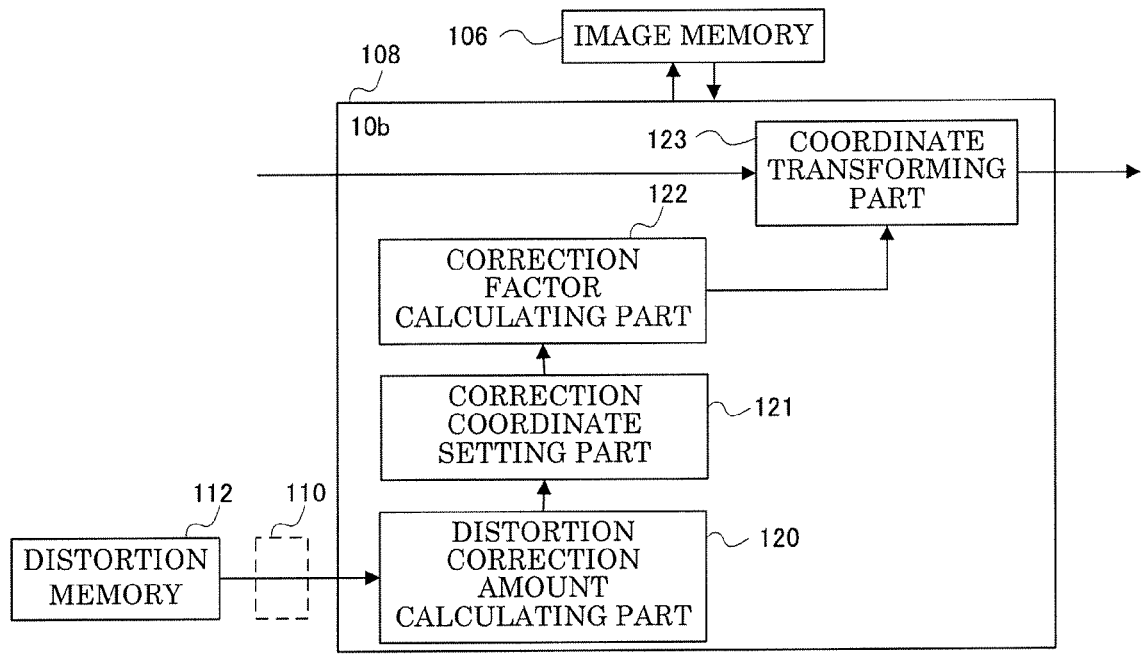
FIG. 2 is a block diagram showing the configuration of a correction processing circuit in Embodiment 1.
Figure 6:
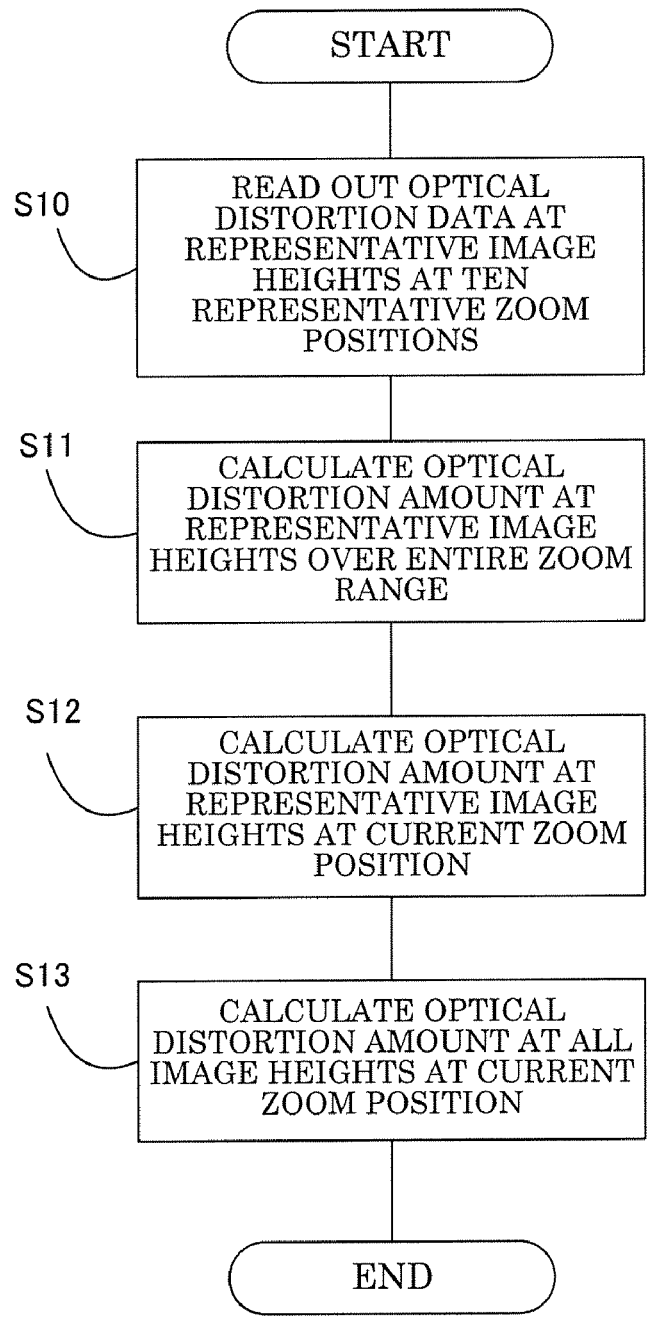
FIG. 6 is a flowchart showing operations of the correction processing circuit of Embodiment 1.

FIG. 2 illustrates the configuration of the correction processing circuit 108 of FIG. 1. In FIG. 2, reference numeral 120 denotes a distortion correction amount calculating part. FIG. 6 is a flowchart of the processing performed by the distortion correction amount calculating part 120.

At Step S10 of FIG. 6, the distortion correction amount calculating part 120 reads out, from the distortion memory 112, the distortion data at the above-described representative image heights at the representative zoom positions.

Next, at Step S11, the distortion correction amount calculating part 120 performs (polynomial) interpolation calculation using the distortion data read out at Step S10 to calculate a continuous optical distortion amount at the representative image heights over the entire zoom range.

Next, at Step S12, the distortion correction amount calculating part 120 acquires, from a zoom position detection part (111a) in the microcomputer 111, information indicating the current position of the variator 101 (zoom position). Then, the distortion correction amount calculating part 120 calculates optical distortion amounts at representative image heights corresponding to the current zoom position among the optical distortion amounts over the entire zoom range calculated at Step S11.

Finally, at Step S13, the distortion correction amount calculating part 120 performs (polynomial) interpolation calculation using the optical distortion amounts at the representative image heights corresponding to the current zoom position calculated at Step S12 to calculate a continuous optical distortion amount at all of the image heights from 0% image height to 100% image height corresponding to the current zoom position.

Reference numeral 121 denotes a correction coordinate setting part, which sets corrected coordinates (X, Y) to be obtained by the conversion of non-corrected coordinates (x, y) based on the optical distortion amounts at all of the image heights corresponding to the current zoom position calculated by the distortion correction amount calculating part 120 (at Step S13).

Reference numeral 122 denotes a correction factor calculating part, which calculates a distortion correction factor used for the conversion of non-corrected coordinates (x, y) to corrected coordinates (X, Y) of each pixel in the image data.

Reference numeral 123 denotes a coordinate transforming part, which multiplies the coordinates of each pixel in non-corrected image data stored in the image memory 106 of FIG. 1 by the distortion correction factor calculated at the correction factor calculating part 122 to calculate coordinates of each pixel of corrected image data. Thus, performing the coordinate conversion generates corrected image data.

The corrected image data is converted into an analogue image signal by a D/A converter 107 of FIG. 1, which is then output to the outside (e.g., to the Internet, a network such as LAN, or an image recording apparatus) via an output terminal part 109.

The above-described polynomial interpolation calculation performed by the distortion correction amount calculating part 120 (Steps S11 and S13) can decrease the amount of the distortion data to be stored in the distortion memory 112. As a result, a distortion correction factor and a pixel correction factor can be obtained using a less memory capacity, which are for obtaining corrected image data with natural appearance.

Figure 3:
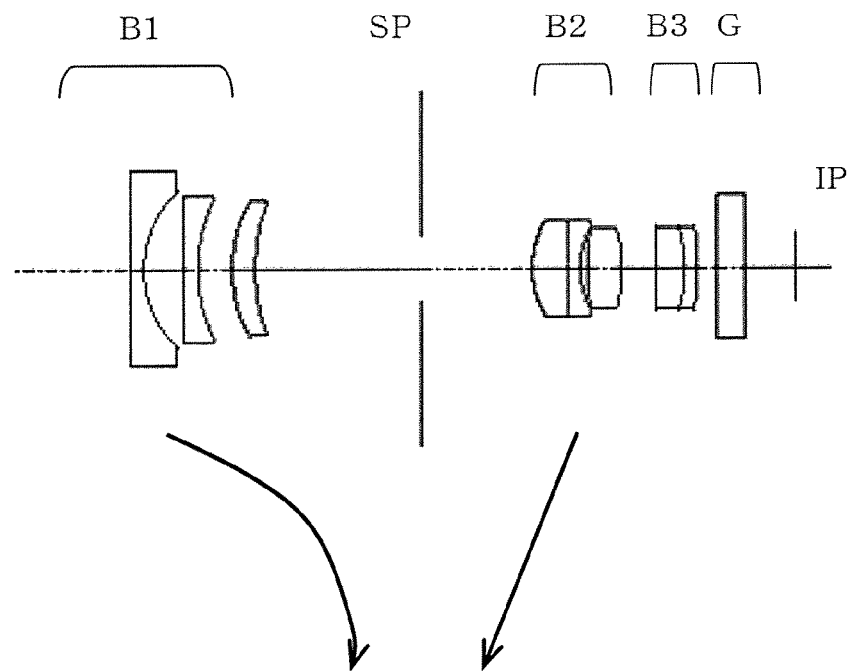
FIG. 3 is a cross-sectional view of a zoom lens (numerical value example 1) used for the image-pickup apparatus of Embodiment 1.

FIG. 3 and Table 1 show exemplary numerical values of the zoom lens of the present embodiment. These numerical values will be described later.

Figure 4:
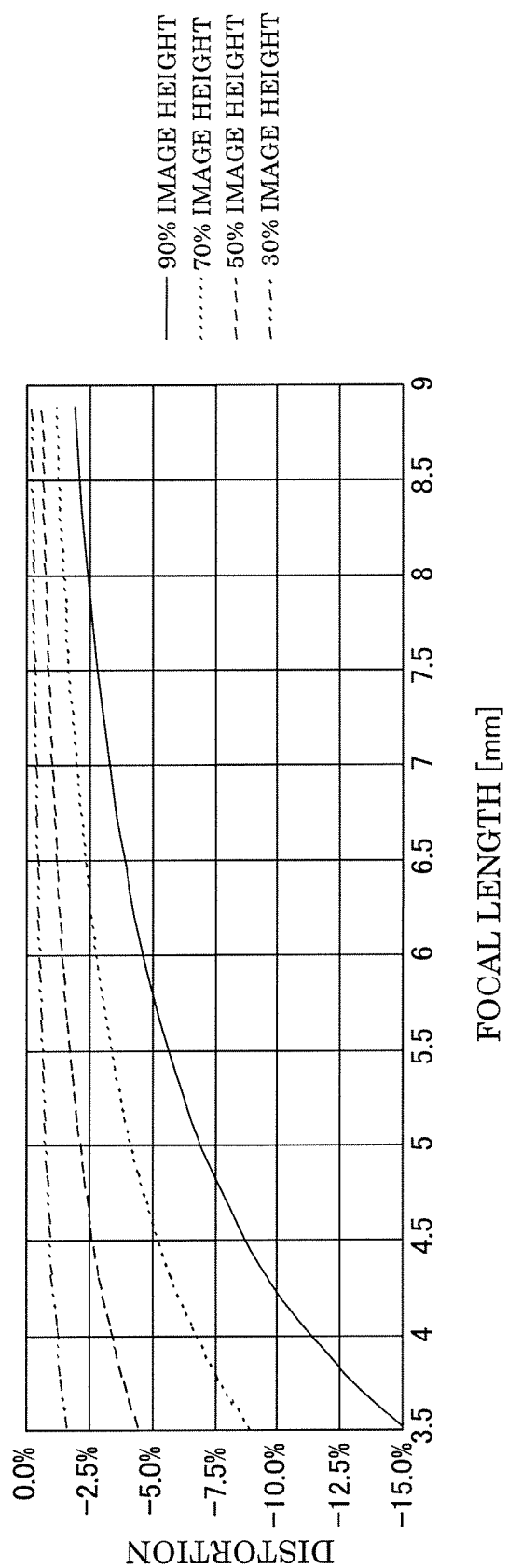
FIG. 4 is a graph showing an optical distortion of the zoom lens of Embodiment 1 (numerical value example 1).
Figure 5:
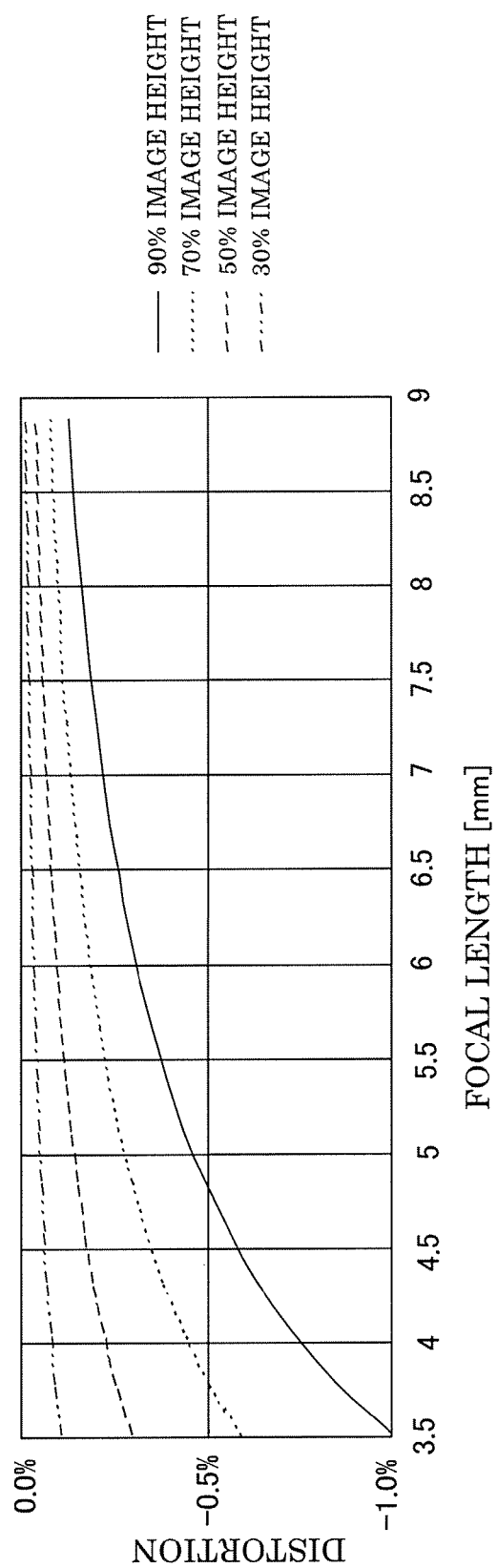
FIG. 5 is a graph showing a distortion component in image data after the distortion correction processing in Embodiment 1.

Referring now to FIGS. 4 and 5, the distortion correction processing for image data in the present embodiment (exemplary numerical values) and the effect thereof will be described below.

FIG. 4 illustrates an optical distortion (referred to as a distortion in the drawing) of the zoom lens 100. It can be considered that a distortion component corresponding to this optical distortion is included in image data prior to the distortion correction processing. In FIG. 4, the horizontal axis represents a focal length, i.e., a zoom position, and the vertical axis represents the amount and the direction of the optical distortion.

In FIG. 4, the absolute value of the distortion component at 90% image height (a certain image height) is larger than 1% (a predetermined value) (1% or larger) over the entire zoom range. Therefore, the distortion correction is performed thereto over the entire zoom range in the present embodiment.

FIG. 5 illustrates a distortion component (referred to as a distortion in the drawing) included in the image data subjected to the distortion correction processing. In FIG. 5, the horizontal axis represents a focal length (a zoom position), and the vertical axis represents the amount and the direction of the distortion component.

As can be seen from this drawing, the remainder of the distortion component at 70% image height is less than 1% over the entire zoom range, which means the distortion correction processing performed favorably.

Herein, as for the distortion component at 90% image height, the remainder between the focal length of 3.5 mm (wide-angle end) and 4.8 mm (a first zoom range) is larger than the remainder between the focal length of 4.9 and 9 mm (a second zoom range). The remainder in the first zoom range is 0.5% or more.

In this way, the distortion correction processing is performed so as to permit the remainder of the distortion component to some extent, whereby the above-stated effect can be obtained.

Embodiment 2

Figure 7:
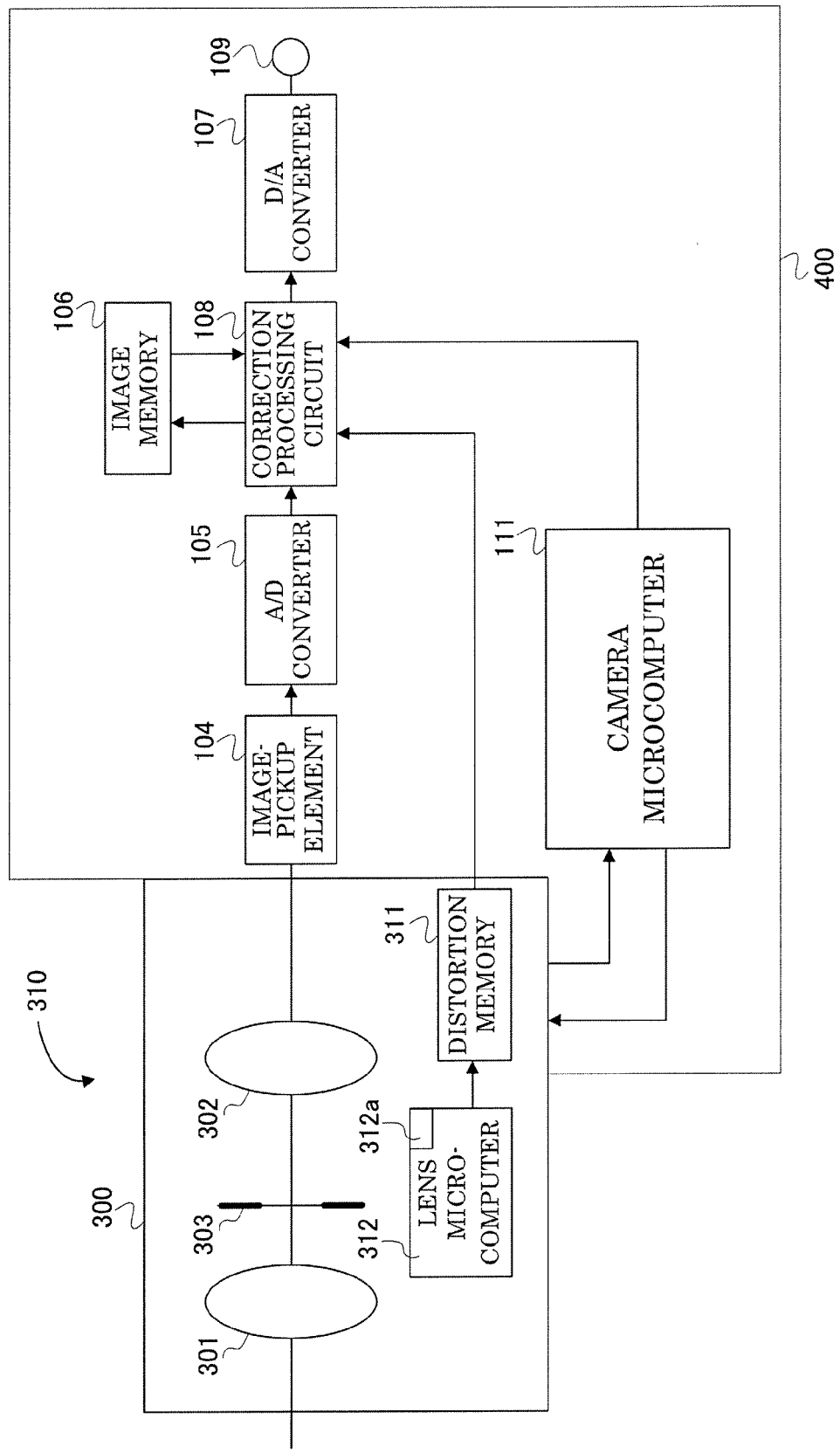
FIG. 7 is a block diagram showing the configuration of an interchangeable lens and an image-pickup apparatus that is Embodiment 2 of the present invention.

FIG. 7 illustrates the configuration of an interchangeable lens and an image-pickup apparatus to which the interchangeable lens is mounted detachably that are Embodiment 2 of the present invention. These interchangeable lens and image-pickup apparatus make up an image-pickup system.

In FIG. 7, reference numeral 400 denotes an image-pickup apparatus, including the elements 104 to 111 described in Embodiment 1 except for the zoom lens 100 and the distortion memory 112. Since the functions of these elements 104 to 111 are the same as those in Embodiment 1, the explanations thereof will be omitted.

Reference numeral 300 denotes the interchangeable lens. Reference numeral 301 denotes a variator, 302 denotes a compensator, and 303 denotes an aperture stop. These elements make up a zoom lens 310 as the image-pickup optical system having a zoom function.

Similarly to the distortion memory 112 of Embodiment 1, the interchangeable lens 300 is provided with a distortion memory 311 with distortion data stored therein.

The camera microcomputer 111 in the image-pickup apparatus 400 requests a lens microcomputer 312 provided in the interchangeable lens 300 to transmit distortion data stored in the distortion memory 311 and information on the current zoom position. In response to the request, the lens microcomputer 312 transmits the distortion data stored in the distortion memory 311 and information on the current zoom position detected by a zoom position detector 312a to the correction processing circuit 108 of the image-pickup apparatus 400. The distortion correction processing by the correction processing circuit 108 and the result are the same as those described in Embodiment 1 referring to FIGS. 2 and 4 to 6.

Embodiment 3

Figure 9:
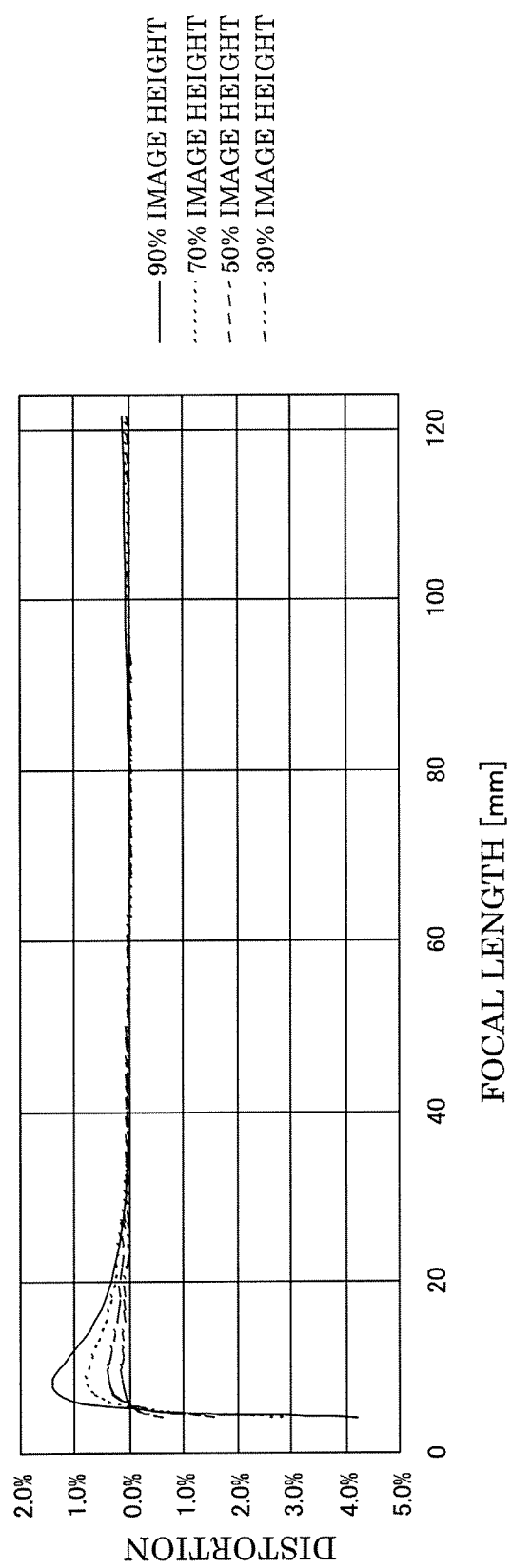
FIG. 9 is a graph showing an optical distortion of the zoom lens of Embodiment 3 (numerical value example 2).
Figure 10:
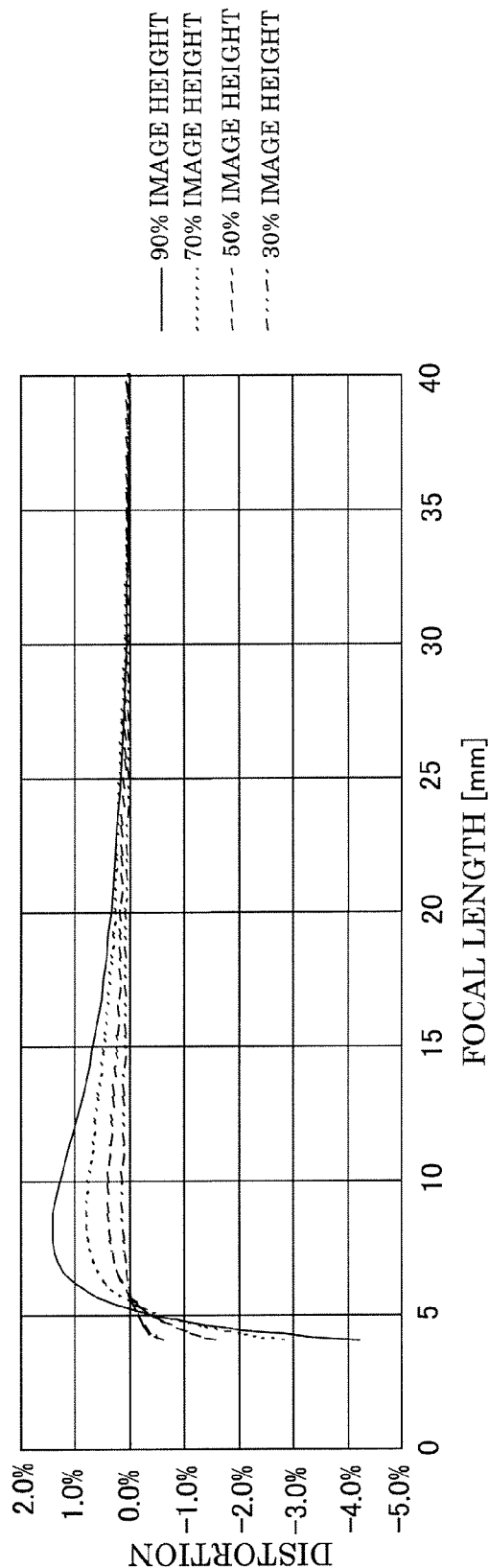
FIG. 10 is a graph showing an enlarged wide-angle end side portion of FIG. 9.
Figure 11:
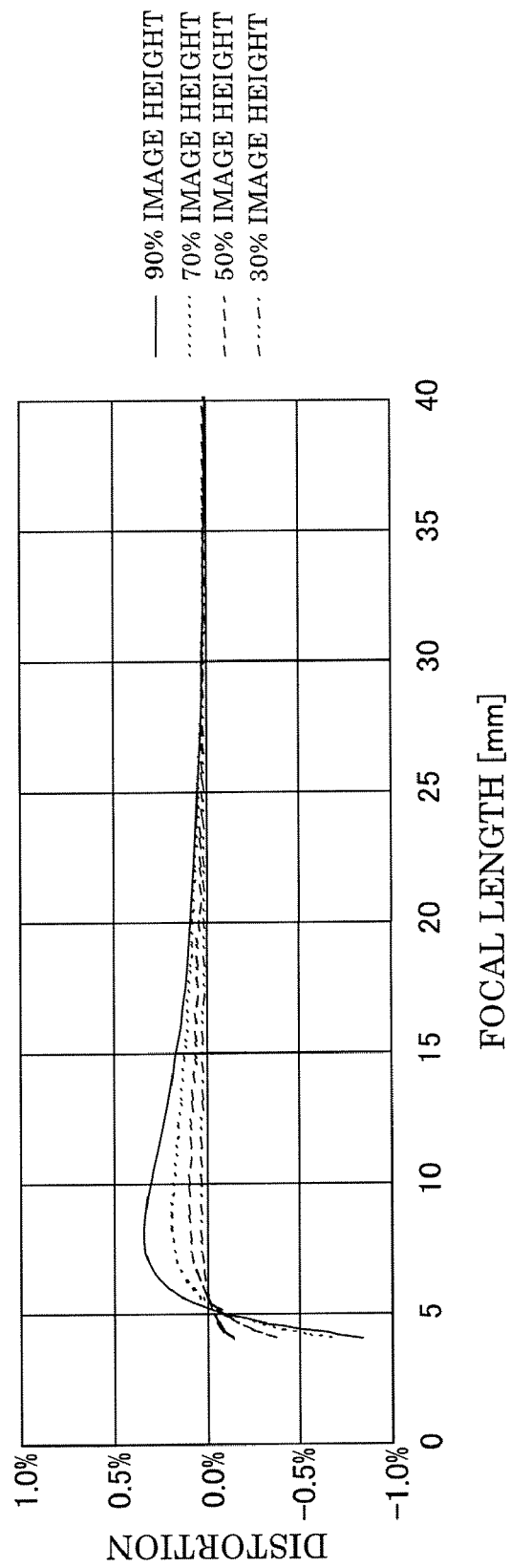
FIG. 11 is a graph showing a distortion component in image data after the distortion correction processing in Embodiment 3.

Referring to FIGS. 9 to 11, distortion correction processing for image data by an image-pickup apparatus that is Embodiment 3 of the present invention and the effects thereof will be described below. The present embodiment can be applied to both of the lens-integral type image-pickup apparatus as in Embodiment 1 and the lens interchangeable-type image-pickup apparatus as in Embodiment 2. In either case, the configuration of the image-pickup apparatus and the interchangeable lens are the same as those described in Embodiments 1 and 2.

Figure 8:
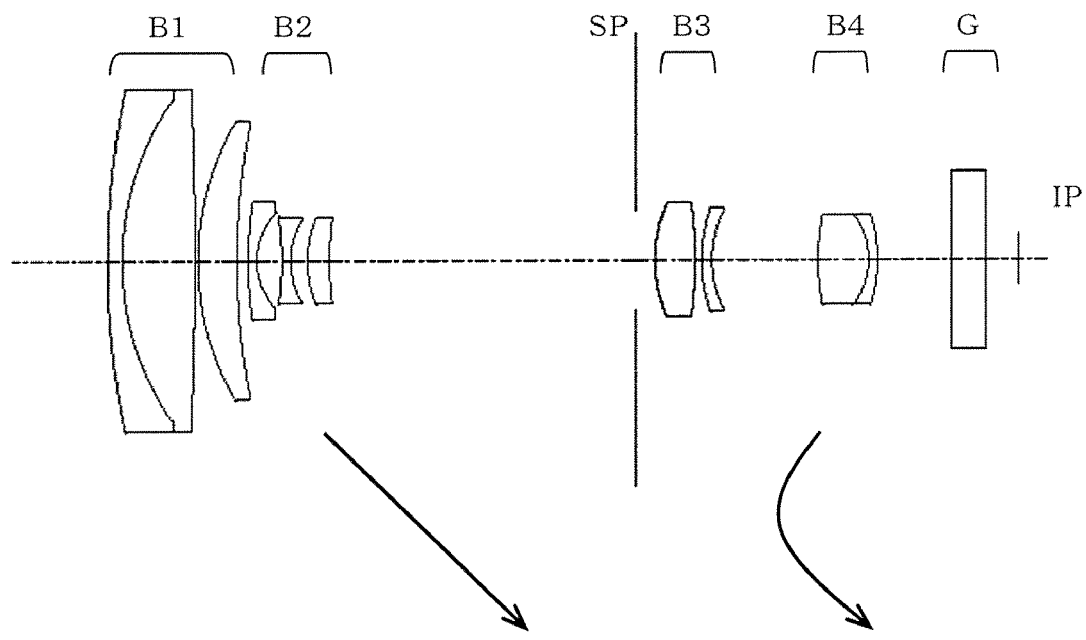
FIG. 8 is a cross-sectional view of a zoom lens (numerical value example 2) used for an image-pickup apparatus that is Embodiment 3 of the present invention.

FIG. 8 and Table 2 illustrate exemplary numerical values of the zoom lens of the present embodiment. These numerical values will be described later.

FIG. 9 illustrates an optical distortion (referred to as a distortion in the drawing) of the zoom lens of the present embodiment. It can be considered that a distortion component corresponding to this optical distortion is included in image data prior to the distortion correction processing. FIG. 10 is an enlarged view of FIG. 9 illustrating the optical distortion in the zoom range from the wide-angle end to the focal length of 40 mm. In FIGS. 9 and 10, the horizontal axis represents a focal length, i.e., a zoom position, and the vertical axis represents the amount and the direction of the optical distortion.

In FIGS. 9 and 10, the optical distortion amount at 90% image height (a certain image height) is smaller than 1% (a predetermined value) in the zoom range of the focal length between 13 and 120 mm (a second zoom range). Therefore, the distortion correction processing (i.e., the calculation for distortion correction) is not performed thereto in the range.

On the other hand, in the zoom range of the focal length between 3 mm (wide-angle end) and 12 mm (a first zoom range), the optical distortion amount at 90% image height is larger than 1% (1% or larger), and therefore the distortion correction processing is performed in the range.

As shown in the enlarged view of FIG. 10, the zoom range to which the distortion correction processing is to be performed is a limited range from the wide-angle end to the focal length of 12 mm. Therefore, in the present embodiment, the execution and non-execution (limitation) of the distortion correction processing is switched based on the current zoom position detected by the zoom position detector (corresponding to 111a of FIG. 1 or 312a of FIG. 7).

As for the processing by the correction processing circuit (corresponding to 108 of FIGS. 1 and 7), a step of determining the current zoom position may be provided prior to Step S10 of the flowchart of FIG. 6. Instead of Step S11 of FIG. 6, a step of calculating optical distortion amounts at representative image heights in the zoom range of the focal length between 3 mm and 12 mm may be provided.

The switching of the execution and the non-execution of the distortion correction processing performed between the focal length of 12 and 13 mm may cause an output image in this zoom range to be unnatural. Thus, the distortion correction factor may be decreased gradually to zero toward the zoom position of the focal length from around 12 mm to 30 mm.

FIG. 11 illustrates a distortion component (referred to as a distortion in the drawing) included in image data subjected to the distortion correction processing. In FIG. 11, the horizontal axis represents a focal length (a zoom position), and the vertical axis represents the amount and the direction of the optical distortion.

As can be seen from this drawing, the remainder of the distortion component is less than 1% over the entire zoom range and at all image heights, which means the distortion correction processing performed favorably.

In the present embodiment, the remainder of the distortion component in the zoom range subjected to the distortion correction processing is larger than the remainder of the distortion component in the zoom range that is not subjected to the distortion correction processing (except for the zoom range where the direction of the distortion component that is originally close to 0% reverses). Especially, the remainders of the distortion components at 90% image height and 70% image height in the first zoom range in the vicinity of the wide-angle end are 0.5% or more.

In this way, the distortion correction processing is performed so as to permit the remainder of the distortion component to some extent, whereby the above-stated effect can be obtained.

In the above Embodiments 1 to 3, the distortion curve indicating the remainder of the distortion component corresponding to the zoom positions after the distortion correction processing has a shape similar to the distortion curve indicating the optical distortion amount corresponding to the zoom positions prior to the distortion correction processing. In this way, the distortion correction processing is performed so as to hardly change the shape of the distortion curve, thus avoiding the image after the correction to be unnatural.

Numerical Value Example 1

FIG. 3 illustrates the optical configuration at a wide-angle end of a zoom lens as a numerical value example of Embodiment 1. Table 1 shows specific numerical values of the zoom lens of FIG. 3.

In FIG. 3, B1 to B3 denote lens units, among which B1 corresponds to the variator 101 and B2 corresponds to the compensator 102 of FIG. 1. The movement of each of the lens units B1 and B2 from the wide-angle end to the telephoto end is indicated by an arrow below thereof.

B3 is a fixed lens unit, and G denotes a glass block such as an optical filter. IP denotes an image plane, at which an image-pickup element 104 is disposed. SP denotes an aperture stop 103.

In Table 1, f denotes a focal length (mm), Fno denotes a F number, and ω denotes a half viewing field. Ri denotes a curvature radius of an i-th lens face from the object side, and Di denotes a distance between the i-th face and an (i+1)-th lens face. Ni and vi denote a refractive index of a material of an i-th lens element and an Abbe constant thereof, respectively. "e-m" means "×10$^{-m}$".

Among the lens faces, the lens face with the mark "*" assigned thereto in Table 1 has an aspheric surface. The aspheric surface can be represented by the following expression, where the X axis is in the optical axis direction, the h axis is in the direction perpendicular to the optical axis, and the light traveling direction from the object is positive:

$$X = \frac{(1/R) h^2}{1 + \sqrt{\{1 - (1+k)(h/R)^2\}}} + Bh^4 + \qquad \text{[Expression 1]}$$
$$Ch^6 + Dh^8 + Eh^{10} + B'h^5 + C'h^7 + D'h^9$$

where, R denotes a paraxial curvature radius, k denotes a conic constant, and B, C, D, E, B', C', and D' denote aspheric coefficients.

These representations of the optical configuration are the same as in the other numerical value examples.

TABLE 1 f = 3.52~6.47~8.88 Fno = 2.1~2.7~3.5 2ω = 65.2~38.4~28.4

| | | | |
|---|---|---|---|
| R1 = 500 | D1 = 1 | N1 = 1.48749 | ν1 = 70.2 |
| R2 = 7.20738 | D2 = 2.74315 | | |
| R3 = −179.539 | D3 = 1 | N3 = 1.48749 | ν3 = 70.2 |
| R4 = 10.49384 | D4 = 2.37 | | |
| R5 = 9.29148 | D5 = 1.6 | N5 = 1.761821 | ν5 = 26.5 |
| R6 = 12.36689 | D6 = VARIABLE | | |
| R7 = APERTURE STOP | D7 = VARIABLE | | |
| *R8 = 6.2371 | D8 = 2.5 | N8 = 1.6935 | ν8 = 53.2 |
| R9 = ∞ | D9 = 0.8 | N9 = 1.698947 | ν9 = 30.1 |
| R10 = 6.16765 | D10 = 0.471 | | |
| R11 = 14.8436 | D11 = 2.4 | N11 = 1.603112 | ν11 = 60.6 |
| R12 = −10.2412 | D12 = VARIABLE | | |
| R13 = 52.4 | D13 = 2 | N13 = 1.696797 | ν13 = 55.5 |
| R14 = −8.6 | D14 = 0.8 | N14 = 1.805181 | ν14 = 25.4 |
| R15 = −32.9 | D15 = 1.4 | | |
| R16 = ∞ | D16 = 2 | N16 = 1.51633 | ν16 = 64.1 |
| R17 = ∞ | | | |

| | FOCAL LENGTH | | |
|---|---|---|---|
| VARIABLE DISTANCE | 3.52 | 6.47 | 8.88 |
| D6 | 11.50 | 3.23 | 2.33 |
| D7 | 7.75 | 4.15 | 1.20 |
| D12 | 2.40 | 6.00 | 8.95 |

ASPHERIC COEFFICIENT

*R8   k = −6.27256e−01   B = −1.46455e−04   C = 3.29397e−06   D = −6.85706e−08

Numerical Value Example 2

FIG. 8 illustrates the optical configuration at a wide-angle end of a zoom lens as a numerical value example of Embodiment 3. Table 2 shows specific numerical values of the zoom lens of FIG. 8.

In FIG. 8, B1 to B4 denote lens units, among which B2 corresponds to the variator 101 and B4 corresponds to the compensator 102 of FIG. 1. The movement of each of the lens units B2 and B4 from the wide-angle end to the telephoto end is indicated by an arrow below thereof.

B1 and B3 are fixed lens units, and G denotes a glass block such as an optical filter. IP denotes an image plane, at which an image-pickup element 104 is disposed. SP denotes an aperture stop 103.

TABLE 2 f = 4.05~33.88~121.47 Fno = 1.85~2.41~4.09 2ω = 58.1~7.6~2.1

| | | | |
|---|---|---|---|
| R1 = 93.29921 | D1 = 1.57895 | N1 = 1.84666 | ν1 = 23.9 |
| R2 = 32.03515 | D2 = 7.75476 | N2 = 1.69680 | ν2 = 55.5 |
| R3 = −432.06900 | D3 = 0.33553 | | |
| R4 = 31.55042 | D4 = 4.13060 | N4 = 1.83481 | ν4 = 42.7 |
| R5 = 79.20390 | D5 = VARIABLE | | |
| R6 = 42.30873 | D6 = 0.98684 | N6 = 1.88300 | ν6 = 40.8 |
| R7 = 7.94740 | D7 = 2.63145 | | |
| R8 = −32.94490 | D8 = 0.98684 | N8 = 1.80400 | ν8 = 46.6 |
| R9 = 9.42246 | D9 = 1.79096 | | |
| R10 = 12.65834 | D10 = 2.35823 | N10 = 1.92286 | ν10 = 18.9 |
| R11 = 35.86117 | D11 = VARIABLE | | |
| R12 = APERTURE STOP | D12 = 2.05931 | | |
| *R13 = 15.86489 | D13 = 4.33576 | N13 = 1.58313 | ν13 = 59.4 |
| *R14 = −44.52370 | D14 = 0.70142 | | |
| R15 = 18.04706 | D15 = 1.08553 | N15 = 1.84666 | ν15 = 23.9 |
| R16 = 12.22853 | D16 = VARIABLE | | |
| R17 = 26.23259 | D17 = 5.35382 | N17 = 1.65844 | ν17 = 50.9 |
| R18 = −8.31712 | D18 = 0.98684 | N18 = 1.84666 | ν18 = 23.9 |
| R19 = −16.93690 | D19 = 7.88022 | | |
| R20 = ∞ | D20 = VARIABLE | N20 = 1.51400 | ν20 = 60.0 |
| R21 = ∞ | | | |

| | FOCAL LENGTH | | |
|---|---|---|---|
| VARIABLE DISTANCE | 4.05 | 33.88 | 121.47 |
| D5 | 1.18 | 25.80 | 31.96 |
| D11 | 32.91 | 8.29 | 2.14 |
| D16 | 11.39 | 4.95 | 15.64 |
| D20 | 7.88 | 14.32 | 3.63 |

TABLE 2-continued

ASPHERIC COEFFICIENT

*R13  k = 4.647200e−01   B' = −1.02406e−08   C' = 1.11769e−08   D' = −3.81049e−10
*R14  k = −5.79269e+01   B' = −6.52820e−06

According to the above-stated embodiments, distortion correction processing is performed so as to permit the remainder of the distortion to some extent in a zoom range with a large distortion amount of the image-pickup optical system, and therefore an image subjected to the favorable distortion correction can be obtained while suppressing deterioration in image quality.

According to the above-stated embodiments, distortion correction processing is performed in a zoom range with a large distortion amount of the image-pickup optical system, while the processing is limited in a zoom range with a small distortion amount. Therefore, a favorable image data can be obtained in each zoom range, while suppressing an increase in calculation load and memory capacity.

Furthermore, the present invention is not limited to these embodiments and various variations and modifications may be made without departing from the scope of the present invention.

This application claims the benefit of Japanese Patent Application No. 2007-179211, filed on Jul. 9, 2007, which is hereby incorporated by reference herein in its entirety.

What is claimed is:

1. An image-pickup apparatus comprising:
an image-pickup element that photoelectrically converts an optical image formed by an image-pickup optical system having a zoom function; and
a correcting part that performs a correction processing for a distortion component in image data generated based on an output from the image-pickup element, the distortion component corresponding to a distortion of the image-pickup optical system,
wherein the image-pickup optical system provides a first zoom range in which an absolute value of a distortion amount at a certain image height is larger than a predetermined value and a second zoom range in which an absolute value of a distortion amount at the certain image height is smaller than the predetermined value,
wherein the correcting part performs the correction processing so that an absolute value of the distortion component remaining in first corrected image data obtained by correcting the image data generated in the first zoom range is larger than an absolute value of the distortion component remaining in second corrected image data obtained by correcting the image data enerated in the second zoom range, and
wherein in the first zoom range, an absolute value of the distortion amount at an image height with an image height ratio of 70% with reference to a maximum image height of the image-pickup element is larger than 1%.

2. A lens that is detachably attached to the image-pickup apparatus according to claim 1, the lens comprising:
an image-pickup optical system having a zoom function and providing a first zoom range in which an absolute value of a distortion amount at a certain image height is larger than a predetermined value, and a second zoom range in which an absolute value of a distortion amount at the certain image height is smaller than the predetermined value; and
a memory that stores data used for the correction processing by the image-pickup apparatus.

3. An image-pickup apparatus comprising:
an image-pickup element that photoelectrically converts an optical image formed by an image-pickup optical system having a zoom function; and
a correcting part that performs a correction processing for a distortion component in image data generated based on an output from the image-pickup element, the distortion component corresponding to a distortion of the image-pickup optical system,
wherein the image-pickup optical system provides a first zoom range in which an absolute value of distortion amount at a certain image height is larger than a predetermined value and a second zoom range in which an absolute value of a distortion amount at the certain image height is smaller than the predetermined value,
wherein the correcting part performs the correction processing so that an absolute value of the distortion component remaining in first corrected image data obtained by correcting the image data generated in the first zoom range is larger than an absolute value of the distortion component remaining in second corrected image data obtained by correcting the image data generated in the second zoom range, and
wherein the first zoom range is included in a zoom range from a wide-angle end to a position where an absolute value of the distortion amount at an image height with an image height ratio of 70% with reference to a maximum image height of the image-pickup element decreases to be 1% firstly.

4. A lens that is detachably attached to the image-pickup apparatus according to claim 3, the lens comprising:
an image-pickup optical system having a zoom function and providing a first zoom range in which an absolute value of a distortion amount at a certain image height is larger than a predetermined value, and a second zoom range in which an absolute value of a distortion amount at the certain image height is smaller than the predetermined value; and
a memory that stores data used for the correction processing by the image-pickup apparatus.

5. An image-pickup apparatus comprising:
an image-pickup element that photoelectrically converts an optical image formed by an image-pickup optical system having a zoom function; and
a correcting part that performs a correction processing for a distortion component in image data generated based on an output from the image-pickup element, the distortion component corresponding to a distortion of the image-pickup optical system,
wherein the image-pickup optical system provides a first zoom range in which an absolute value of distortion amount at a certain image height is larger than a predetermined value and a second zoom range in which an absolute value of a distortion amount at the certain image height is smaller than the predetermined value,
wherein the correcting part performs the correction processing so that an absolute value of the distortion component remaining in first corrected image data obtained by correcting the image data generated in the first zoom range is larger than an absolute value of the distortion component remaining in second corrected image data obtained by correcting the image data generated in the second zoom range, and wherein the absolute value of the distortion component remaining in the image data after the correction processing in the first zoom range is larger than 0.5% at an image height with an image height ratio of 70% with reference to a maximum image height of the image-pickup element.

6. A lens that is detachably attached to the image-pickup apparatus according to claim 5, the lens comprising:
an image-pickup optical system having a zoom function and providing a first zoom range in which an absolute value of a distortion amount at a certain image height is larger than a predetermined value, and a second zoom range in which an absolute value of a distortion amount at the certain image height is smaller than the predetermined value; and
a memory that stores data used for the correction processing by the image-pickup apparatus.

7. An image-pickup apparatus comprising:
an image-pickup element that photoelectrically converts an optical image formed by an image-pickup optical system having a zoom function; and
a correcting part that performs a correction processing for a distortion component in image data generated based on an output from the image-pickup element, the distortion component corresponding to a distortion of the image-pickup optical system,
wherein the image-pickup optical system provides a first zoom range in which an absolute value of distortion amount at a certain image height is larger than a predetermined value and a second zoom range in which an absolute value of a distortion amount at the certain image height is smaller than the predetermined value,
wherein the correcting part performs the correction processing in the first zoom range and limits the correction processing in the second zoom range,
wherein the correcting part performs the correction processing in the first zoom range so that an absolute value of the distortion component remaining in first corrected image data obtained by correcting the image data generated in the first zoom range is larger than an absolute value of the distortion component of the image data generated in the second zoom range remaining in the image data, and
wherein in the first zoom range, an absolute value of the distortion amount at an image height with an image height ratio of 70% with reference to a maximum image height of the image-pickup element is larger than 1%.

8. A lens that is detachably attached to the image-pickup apparatus according to claim 7, the lens comprising:
an image-pickup optical system having a zoom function and providing a first zoom range in which an absolute value of a distortion amount at a certain image height is larger than a predetermined value, and a second zoom range in which an absolute value of a distortion amount at the certain image height is smaller than the predetermined value; and
a memory that stores data used for the correction processing by the image-pickup apparatus.

9. An image-pickup apparatus comprising:
an image-pickup element that photoelectrically converts an optical image formed by an image-pickup optical system having a zoom function; and
a correcting part that performs a correction processing for a distortion component in image data generated based on an output from the image-pickup element, the distortion component corresponding to a distortion of the image-pickup optical system,
wherein the image-pickup optical system provides a first zoom range in which an absolute value of a distortion amount at a certain image height is larger than a predetermined value and a second zoom range in which an absolute value of a distortion amount at the certain image height is smaller than the predetermined value,
wherein the correcting part performs the correction processing in the first zoom range and limits the correction processing in the second zoom range,
wherein the correcting part performs the correction processing in the first zoom range so that an absolute value of the distortion component remaining in first corrected image data obtained by correcting the image data generated in the first zoom range is larger than an absolute value of the distortion component of the image data generated in the second zoom range remaining in the image data, and
wherein the first zoom range is included in a zoom range from a wide-angle end to a position where an absolute value of the distortion amount at an image height with an image height ratio of 70% with reference to a maximum image height of the image-pickup element decreases to be 1% firstly.

10. A lens that is detachably attached to the image-pickup apparatus according to claim 8, the lens comprising:
an image-pickup optical system having a zoom function and providing a first zoom range in which an absolute value of a distortion amount at a certain image height is larger than a predetermined value, and a second zoom range in which an absolute value of a distortion amount at the certain image height is smaller than the predetermined value; and
a memory that stores data used for the correction processing by the image-pickup apparatus.

11. An image-pickup apparatus comprising:
an image-pickup element that photoelectrically converts an optical image formed by an image-pickup optical system having a zoom function; and
a correcting part that performs a correction processing for a distortion component in image data generated based on an output from the image-pickup element, the distortion component corresponding to a distortion of the image-pickup optical system,
wherein the image-pickup optical system provides a first zoom range in which an absolute value of a distortion amount at a certain image height is larger than a predetermined value and a second zoom range in which an absolute value of a distortion amount at the certain image height is smaller than the predetermined value,
wherein the correcting part performs the correction processing in the first zoom range and limits the correction processing in the second zoom range,
wherein the correcting part performs the correction processing in the first zoom range so that an absolute value of the distortion component remaining in first corrected image data obtained by correcting the image data generated in the first zoom range is larger than an absolute value of the distortion component of the image data generated in the second zoom range remaining in the image data, and wherein the absolute value of the distortion component remaining in the image data after the correction processing in the first zoom range is larger than 0.5% at an image height with an image height ratio of 70% with reference to a maximum image height of the image-pickup element.

12. A lens that is detachably attached to the image-pickup apparatus according to claim 11, the lens comprising:

an image-pickup optical system having a zoom function and providing a first zoom range in which an absolute value of a distortion amount at a certain image height is larger than a predetermined value, and a second zoom range in which an absolute value of a distortion amount at the certain image height is smaller than the predetermined value; and a memory that stores data used for the correction processing by the image-pickup apparatus.

* * * * *